US008181054B2

(12) United States Patent
Terechko et al.

(10) Patent No.: US 8,181,054 B2
(45) Date of Patent: May 15, 2012

(54) ARRANGEMENT AND METHOD FOR CONTROLLING POWER MODES OF HARDWARE RESOURCES

(75) Inventors: Andrei Terechko, Eindhoven (NL); Manish Garg, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/117,314

(22) Filed: May 27, 2011

(65) Prior Publication Data
US 2011/0231688 A1  Sep. 22, 2011

Related U.S. Application Data

(63) Continuation of application No. 12/354,364, filed on Jan. 15, 2009, now abandoned, which is a continuation of application No. 10/561,625, filed as application No. PCT/IB03/05611 on Dec. 3, 2003, now Pat. No. 7,500,126.

(60) Provisional application No. 60/430,884, filed on Dec. 4, 2002.

(51) Int. Cl.
*G06F 1/32* (2006.01)
(52) U.S. Cl. .......................................... 713/323; 713/324
(58) Field of Classification Search .................. 713/323, 713/324
See application file for complete search history.

(56) References Cited

U.S. PATENT DOCUMENTS

| | | | | |
|---|---|---|---|---|
| 5,452,401 A * | 9/1995 | Lin | ............... | 713/322 |
| 5,495,617 A * | 2/1996 | Yamada | ............... | 713/323 |
| 5,585,745 A * | 12/1996 | Simmons et al. | ............... | 326/93 |
| 5,627,492 A * | 5/1997 | Weaver et al. | ............... | 327/544 |
| 5,634,131 A * | 5/1997 | Matter et al. | ............... | 713/322 |
| 5,825,674 A * | 10/1998 | Jackson | ............... | 713/321 |
| 5,910,930 A * | 6/1999 | Dieffenderfer et al. | ............... | 368/156 |
| 6,219,796 B1 * | 4/2001 | Bartley | ............... | 713/320 |
| 6,307,281 B1 * | 10/2001 | Houston | ............... | 307/31 |
| 6,345,362 B1 * | 2/2002 | Bertin et al. | ............... | 713/300 |
| 6,477,654 B1 * | 11/2002 | Dean et al. | ............... | 713/300 |
| 6,535,984 B1 * | 3/2003 | Hurd | ............... | 713/320 |
| 6,604,202 B1 * | 8/2003 | Nishii et al. | ............... | 713/324 |
| 6,625,740 B1 * | 9/2003 | Datar et al. | ............... | 713/324 |
| 6,785,826 B1 * | 8/2004 | Durham et al. | ............... | 713/300 |
| 6,845,445 B2 * | 1/2005 | Marchand et al. | ............... | 713/100 |
| 6,965,991 B1 * | 11/2005 | Marchand et al. | ............... | 713/100 |
| 6,976,178 B1 * | 12/2005 | Kissell | ............... | 713/300 |
| 7,114,089 B2 * | 9/2006 | Launiainen | ............... | 713/323 |
| 7,500,126 B2 * | 3/2009 | Terechko et al. | ............... | 713/323 |
| 7,539,879 B2 * | 5/2009 | Terechko et al. | ............... | 713/300 |
| 2002/0004916 A1 * | 1/2002 | Marchand et al. | ............... | 713/322 |
| 2002/0087897 A1 * | 7/2002 | Cline et al. | ............... | 713/300 |
| 2003/0126484 A1 * | 7/2003 | Catherwood | ............... | 713/320 |
| 2003/0177482 A1 * | 9/2003 | de Dinechin | ............... | 717/149 |

* cited by examiner

*Primary Examiner* — Chun Cao

(57) ABSTRACT

A circuit arrangement and method of executing program code which utilize power control instructions capable of dynamically controlling power dissipation of multiple hardware resources during execution of a program by a processor. The processor configured to process such power control instructions and to maintain the power modes of the multiple hardware resources to that specified in an earlier-processed power control instruction, such that subsequently-processed instructions will be processed while the power modes of the multiple hardware resources are set to that specified by the earlier-processed power control instruction.

17 Claims, 3 Drawing Sheets

ARRANGEMENT AND METHOD FOR CONTROLLING POWER MODES OF HARDWARE RESOURCES

RELATED PATENT DOCUMENTS

This patent document is a continuation under 35 U.S.C. §120 of U.S. patent application Ser. No. 12/354,364 filed on Jan. 15, 2009 now abandoned, which is a continuation under 35 U.S.C. §120 of U.S. patent application Ser. No. 10/561,625 filed on Dec. 19, 2005 (U.S. Pat. No. 7,500,126), which is a 35 U.S.C. §371 national stage entry of International Application No. PCT/IB2003/005611 filed on Dec. 3, 2003, which claims priority benefit under 35 U.S.C. §119 of U.S. Application No. 60/430,884 filed on Dec. 4, 2002, to which priority is also claimed here.

The invention is generally related to controlling power dissipation in integrated circuits, e.g., for use in low power and other power sensitive applications.

Power dissipation is often a principal design constraint for many integrated circuits (IC's), or "chips". Integrated circuits, for example, are increasingly used in a wide variety of portable and other battery-powered applications, such as in mobile telephones and other wireless communication devices, portable computers, handheld appliances and game consoles, etc. Moreover, even in non-portable applications, where battery life may not be a concern, integrated circuits can be susceptible to excessive heat, resulting in either the need for expensive and/or bulky cooling components, or reduced IC reliability. The amount of power dissipated by IC's plays a significant role in both battery life and heat generation in an electronic device.

Furthermore, as IC's become more complex, and incorporate faster clock speeds and greater numbers of transistors, the amount of power dissipated by these IC's increases proportionately. As such, significant development efforts have been directed to reducing IC power dissipation.

Some efforts, for example, have been directed to decreasing the power dissipation of individual transistors in an IC, e.g., through modifying a transistor's layout and/or reducing supply voltage. To some extent, modifications to transistor designs and decreases in supply voltage levels have offset some of the increases in power dissipation that have resulted from the use of more complex and higher performing IC's. Nevertheless, additional reductions have been required for many power sensitive applications.

For example, some IC's such as microprocessors for use in mobile applications utilize voltage and/or frequency scaling to reduce the supply voltage and/or clock frequency, and consequently to reduce overall power dissipation. However, such reductions are typically applied IC-wide, and are accompanied by corresponding reductions in processing performance.

Other designs may incorporate sleep modes that place an IC in a low power state in response to a particular command or instruction, or an event such as an external interrupt. For example, some microprocessors support WAIT or HALT instructions that place an entire microprocessor in a low power sleep mode. However, when in such a mode, all effective processing activity in the microprocessor is typically halted until the microprocessor is reawakened by an interrupt or other triggering event.

In still other designs, IC's may have different circuits that are capable of being selectively disabled when they are not in use to reduce overall power dissipation. Typically, such circuits are selectively enabled or disabled in response to the execution of particular instructions that are encountered in association with the execution of a computer program, particularly for IC's that incorporate some form of processor or processing core.

For example, some low power microprocessor designs permit individual functional units to be selectively disabled by routing specific "power down" instructions to those functional units. The power down instructions are inserted by a compiler during compilation of a computer program, such that the instructions will be processed by individual functional units during execution of the computer program by the microprocessor. One drawback of such an approach, however, is that sending individual instructions to specific functional units occupies the processing resources of such functional units, and thus decreases the availability of such functional units, and of the remainder of the processor pipeline, for handling other, productive computational operations.

Related to the aforementioned power down instructions is the use of control bits, associated with each instruction processed by a microprocessor, that dynamically control the enabled status of each functional unit in the microprocessor. However, in this type of design, constant instruction decoding of each instruction is required, which can offset some of the power dissipation reductions obtained by selectively disabling individual functional units. Moreover, the time required to disable or enable a particular functional unit in response to a particular set of control bits may limit the feasible operating frequency of the microprocessor, thus limiting the overall performance of the microprocessor. Furthermore, the addition of control bits to each instruction increases the size of the code, and thus increases storage requirements, or decreases the number of different instructions that may be supported.

Another drawback to the aforementioned instruction-based control schemes is that they are often limited to controlling functional units in a microprocessor. While functional units, e.g., execution units, arithmetic logic units, floating point units, fixed point units, etc., do provide a significant contribution to the overall power dissipation in a microprocessor, most designs incorporate a significant amount of additional circuitry, e.g., caches, register files, etc., that also contribute to power dissipation, but are not addressed by the aforementioned control schemes.

Still other designs may incorporate multiple instruction sets that support different power operations of a microprocessor. Typically, in such designs, one instruction set may utilize a microprocessor fully, whereas another instruction set may use only a part of the microprocessor, thus reducing power consumption. One drawback to this approach, however, is that only a limited number of modes of processor utilization are supported i.e., full and restricted. Furthermore, the complexity of the code, and thus of the decoding logic in the processor, increases, which itself can increase power dissipation.

In a related field of development, multiple versions of programs may be utilized to support different power dissipation capabilities. However, storing multiple versions of programs requires the use of a run-time scheduler that selects a code version for execution, depending on the current power requirements, and storing multiple code versions requires more program memory and execution of the scheduler, which can further increase power dissipation.

With respect to selectively enabling individual circuits in an IC, various manners of disabling these circuits, and thus minimizing their power consumption, may be used. For example, clock gating is often used to disable clocking to a circuit, which effectively limits switching of the transistors in the circuit, as it is often the switching of states in transistors that accounts for the greatest amount of power dissipation in a circuit.

For functional units in a microprocessor, an alternative manner of disabling a circuit is to shutdown the power supply to the circuit. Yet another alternative manner is to deactivate input signals to the circuit.

Also, for other circuits, such as memory arrays utilized in dynamic random access memory (DRAM) devices, clock signals and sense amplifiers may be selectively gated off to disable banks of memory cells in an array, and thus reduce power dissipation in the overall array.

Despite the significant gains that have been made in connection with controlling power dissipation in IC's such as microprocessors and the like, a continuing need exists for further improvements in the field.

For example, in the area of program control of selectively disabled circuits in IC's, a need still exists for a manner of selectively disabling circuits having greater granularity and flexibility, and lesser overhead, than is supported by conventional circuit control schemes.

The invention addresses these and other problems associated with the prior art by providing a circuit arrangement, method of executing program code and method of generating program code that utilize power control instructions capable of dynamically controlling power dissipation of multiple hardware resources during execution of a program by a processor. Moreover, a processor configured to process such power control instructions is capable of maintaining the power modes of the multiple hardware resources to that specified in an earlier-processed power control instruction, such that subsequently-processed instructions will be processed while the power modes of the multiple hardware resources are set to that specified by the earlier-processed power control instruction.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

Dynamic power dissipation control consistent with the invention may incorporate either or both of two concepts that provide substantial advantages over conventional power dissipation control techniques. The first concept applies uniquely to implementing power dissipation control over a register file utilized by a processor or processing core. Consistent with the invention, a register file is partitioned in to multiple banks of registers, with each bank of registers including clock, data and address input lines. Enable logic is coupled to such a register file to selectively gate off or disable the clock, data and address input lines for any unused bank of registers in the register file.

The second concept applies more generally to a software-based manner of controlling power dissipation in an integrated circuit that includes a processor or other programmable circuit that processes software instructions. In particular, power control instructions incorporated into program code executed by a processor are used to control the power modes of multiple hardware resources that are selectively configurable into two or more power modes, with each mode for a hardware resource having a particular power consumption state for that hardware resource.

Each power control instruction includes power control information disposed in an operand thereof that is capable of setting the power modes of multiple hardware resources. Furthermore, once the power modes are set by a particular power control instruction, the set power modes are utilized during the processing of subsequent instructions by the processor, e.g., until the power modes are reset by another power control instruction, or a special event (e.g., an external interrupt).

Each of these concepts will be described in greater detail in connection with a description of an exemplary embodiment of a processor integrated circuit that utilizes software-based power dissipation control of a register file. Prior to discussing this specific embodiment, however, an exemplary hardware and software environment is described in greater detail below.

Figure 1:
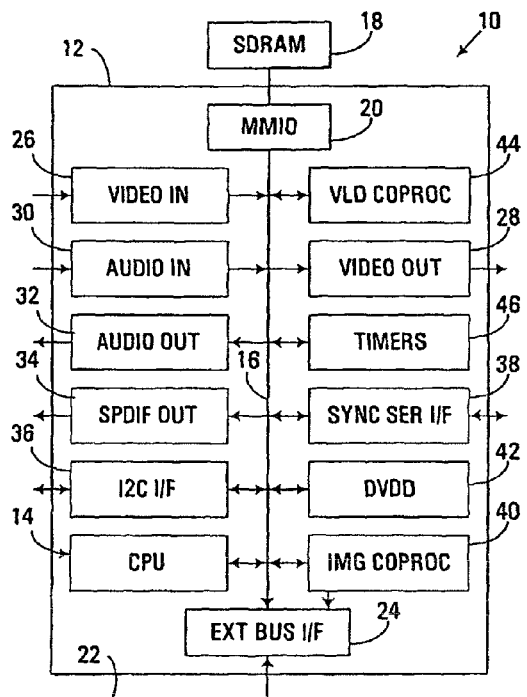
FIG. 1 is a block diagram of a media processor incorporating a dynamic power dissipation control circuit consistent with the invention.

Turning to the Drawings, wherein like numbers denote like parts throughout the several views, FIG. 1 illustrates an exemplary hardware and software environment for a data processing system 10 including a media processor 12 that implements dynamic power dissipation control consistent with the invention. Media processor 12 may be implemented, for example, as a PNX1300 Series TriMedia-compatible media processor available from Philips Semiconductors, or alternatively another media processor architecture such as the Equator MAP1000, TI TMS320C6xxx, BOPS ManArray, etc. Media processor 12 is a system-on-chip (SOC) integrated circuit device including a central processing unit (CPU) or processing core 14 coupled via an internal bus 16 to a plurality of additional circuit components incorporated into the same integrated circuit device.

CPU 14 may be implemented, for example, as a VLIW processor core, e.g., incorporating a 32-bit address space and a register file comprising 128 32-bit general purpose registers. The processor core includes 27 functional units accessible via five issue slots, as well as 16-KB data and 32-KB instruction caches, with the data cache being dual-ported, and with both caches being 8-way set associative with a 64-byte block size.

Working memory for processor 12 is supplied by an external memory 18 (e.g., SDRAM memory) accessed via a main memory input/output interface block 20, while connectivity to external peripheral components over a peripheral bus 22 (e.g., PCI bus) is facilitated by an external bus interface block 24.

To support various media-processing functions, media processor 12 includes various specialized media processing circuits, including video in/out blocks 26, 28; audio in/out blocks 30, 32; SPDIF output block 34; I2C interface block 36; synchronous serial interface block 38; image coprocessor block 40; DVD Descrambler (DVDD) block 42; Variable Length Decoding (VLD) coprocessor block 44; and timers block 46.

Figure 2:
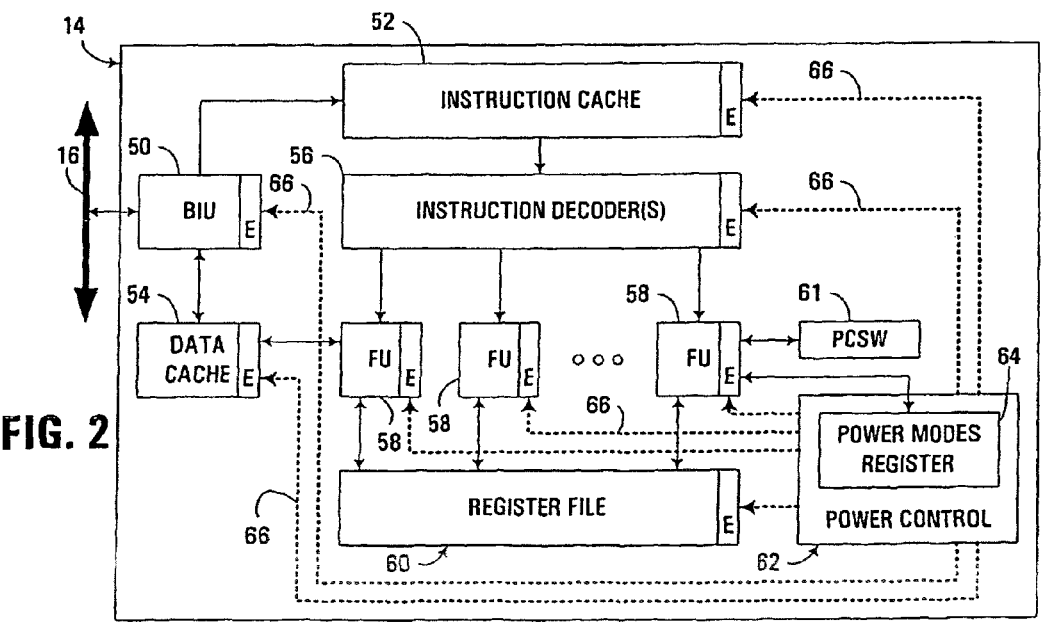
FIG. 2 is a block diagram of the central processing unit referenced in FIG. 1, an including a dynamic power dissipation control circuit consistent with the invention.

Now turning to FIG. 2, CPU 14 is illustrated in greater detail, and is shown including a bus interface unit (BIU) 50 coupling internal bus 16 to an instruction cache 52 and a data cache 54. Instructions from instruction cache 52 are fed to one or more instruction decoders 56, which output instructions to one or more functional units 58, e.g., various arithmetic logic units, floating point units, subword-parallel multimedia operation units, load/store units, SIMD multimedia operation units, vector multimedia operation units, multipliers, branch units, etc. As noted above, CPU 14 may support VLIW instructions, whereby multiple instruction slots (e.g., five) may be used when processing a VLIW instruction to concurrently route multiple operations encoded into a VLIW instruction to multiple functional units.

CPU 14 is typically implemented as a load/store architecture, whereby functional units 58 access a register file 60, here including 128 32-bit general purpose registers. An additional supported register is a Program Control and Status Word (PCSW) register 61, which is used to set various configuration settings for the CPU, e.g., with respect to floating point operations, byte sex (big/little endian), interrupt enables, exceptions, etc. To provide dynamic power dissipation control consistent with the invention, CPU 14 also includes a power control circuit 62, within which is illustrated a support register 64, herein referred to as a power modes register, within which is stored power mode state information for various hardware resources in media processor 12 that are capable of being selectively disabled to minimize power dissipation in the media processor. In some implementations it may be desirable to also support the storage of power mode state information in the PCSW or in another support register in the CPU, whereby the power modes state information is combined with other status information that is unrelated to power dissipation control.

Power control circuit 62 controls power dissipation throughout CPU 14, and optionally elsewhere in media processor 12, via the assertion of one or more enable signals 66 to enable logic embedded within various hardware resources in the CPU 14 and/or media processor 12. In this context, a hardware resource may represent practically any electronic circuit in an integrated circuit for which is may be practical and/or desirable to disable for the purpose of reducing power dissipation in the integrated circuit. In CPU 14, for example, BIU 50, caches 52, 54, instruction decoders 56, functional units 58 and register file 60 are all illustrated as being hardware resources capable of being selectively disabled, by virtue of the presence of enable logic (designated by the reference indicator "E") on each respective block.

In the illustrated embodiment, power control circuit 62 selectively asserts enable signals 66 in response to power mode state information stored in power modes register 64. This state information is set in register 64 in response to power control instructions that are embedded within a program being executed by CPU 14. These power control instructions are typically decoded by instruction decoders 56 and used to update power modes register 64, in much the same manner as other conventional register store instructions-commonly utilized in the art.

It will be appreciated that the enable signals 66 may be used to completely enable/disable an entire block or hardware resource, or may be used to enable/disable only portions of such blocks/resources and/or to select from among multiple available power consumption states for all or only portions of such blocks/resources. For example, a hardware resource may support more than two power modes, e.g., a sleep or fully off mode, two or more low power or energy saving modes, and a full power mode. While single lines are illustrated for each enable signal 66 in FIG. 2, it will be appreciated that multiple signal paths may be utilized to selectively enable portions of each hardware resource to varying degrees of granularity. Also, it will be appreciated that a hardware resource may utilize practically any known energy saving or power dissipation reduction technique known in the art, so long as such technique is capable of being selectively enabled under the control of a power control circuit as described herein.

In the embodiment discussed hereinafter, for example, a hardware resource such as a register file may be controlled so as to reduce power dissipation through the organization of the register file into a plurality of register banks that are individually capable of being selectively disabled in response to power control instructions in a program being executed by a processor. In this regard, each register bank may itself be considered to represent a separate hardware resource.

In the illustrated embodiment, each register bank utilizes enable logic that gates off not only the clock signal, but also the address and data input signals to each disabled register bank. As will become more apparent below, gating off clock, address and data input signals collectively often provides optimal energy savings as the CMOS latches or flip-flops utilized in connection with general purpose registers are often subjected to higher wire capacitances. However, other manners of disabling a register file may be utilized in some embodiments consistent with the invention.

Moreover, while power control circuit 62 is illustrated as being used to control hardware resources disposed solely within CPU 14, it will be appreciated that a power control circuit may be utilized to control other hardware resources consistent with the invention, including for example, resources disposed elsewhere on the same integrated circuit (e.g., all or portions of any of the functional blocks illustrated in FIG. 1), as well as hardware resources disposed on another integrated circuit. A power control circuit consistent with the invention may be used to control power dissipation, in fact, in connection with a wide variety of hardware resources, including for example, register files, memories, caches, issue slots, busses, functional units, functional blocks, IO pads or pins, buffers, instruction reorder logic, embedded field programmable gate arrays (FPGA's), coprocessors, or practically any type of electronic circuit that is capable of being disabled and/or set to a state having a reduced level of power dissipation. Moreover, any of the aforementioned circuits may be considered to incorporate multiple hardware resources that are separately controllable, e.g., such that individual portions of such circuits can be selectively disabled (e.g., individual banks or registers in a register file, individual sets of a cache, individual lines or groups of lines in a bus, etc.)

Furthermore, while power control circuit 62 is illustrated as being disposed in CPU 14, it will be appreciated that a power control circuit may be functionally separate from a CPU or other processing core. In general, the particular manner in which power dissipation control functionality is allocated on an integrated circuit can vary in different embodiments, and as such, the invention is not limited to the particular implementation discussed herein.

As an additional matter, the implementation of power control circuit 62 within a media processor is provided herein by way of example. Power dissipation control, and in particular, the use of power control instructions as described hereinafter, may be utilized in a wide variety of alternate integrated circuits consistent with the invention. Power control instructions, for example, may be utilized in connection with various processor architectures, including VLIW, EPIC, RISC, CISC, DSP, superscalar, etc. Furthermore, the invention is not limited to use within SOC architectures, or other architectures where a processing core is integrated with other supporting circuitry.

In many instances, significant benefits in terms of power dissipation reduction will be realized in connection with VLIW, EPIC, superscalar or other wide-issue architectures where parallel hardware resources may be under-utilized at all times during program execution, as oftentimes underutilized parallel hardware resources may be selectively disabled consistent with program utilization demands. However, the invention is not limited to applicability solely in connection with wide-issue architectures and the like.

In general, it will be appreciated that any of the hardware-based functionality discussed herein is typically implemented in a circuit arrangement incorporated into one or more integrated circuits, and optionally including additional supporting electronic components. Moreover, as is well known in the art, integrated circuits are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuits and data processing systems utilizing the same, those skilled in the art will appreciate that circuit arrangements consistent with the invention are also capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links. In some embodiments consistent with the invention, other integrated circuit technologies, e.g., FPGA's and the like may also be used to implement some of the hardware-based functionality discussed herein.

As noted above, power control circuit 62 may be controlled via power control instructions embedded within a program executed by CPU 14. These power control instructions may be generated by a programmer, or in the alternative, may be added to a program in an automated fashion by a compiler, linker, optimizer, etc. Moreover, while such automated addition of program control instructions typically occurs prior to runtime, in some embodiments, runtime addition of program control instructions may be utilized, e.g., in connection with just-in-time compilation/optimization or runtime interpretation/instruction decoding.

The automated addition of program control instructions, regardless of the particular manner implemented (i.e., prior to or during runtime, in a compiler or optimizer, etc.), is typically implemented using one or more routines that will be described in greater detail hereinafter. These routines, whether implemented in an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer or data processing system, and that, when read and executed by one or more processors in a computer, cause that computer to perform the steps necessary to execute steps or elements embodying the various aspects of the invention. Moreover, while the software-related aspects of the invention has and hereinafter will be described in the context of computers and data processing systems, those skilled in the art will appreciate that the various embodiments of the invention are capable of being distributed as a program product in a variety of forms, and that the invention applies equally regardless of the particular type of signal bearing media used to actually carry out the distribution.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

As noted above, dynamic power dissipation control consistent with the invention may incorporate either or both of two concepts that provide substantial advantages over conventional power dissipation control techniques. The first concept applies uniquely to implementing power dissipation control over a register file utilized by a processor or processing core. The second concept applies more generally to a software-controlled manner of controlling power dissipation in an integrated circuit. To facilitate a better understanding of each of these concepts, an exemplary embodiment incorporating both concepts is described hereinafter in connection with FIGS. 3-6. It will be appreciated, however, that the two concepts discussed hereinafter may be utilized separately and independently in other embodiments, and as such, the invention is not limited to the particular implementation discussed hereinafter.

FIGS. 3-6, in particular, illustrate the software-based control of the power dissipation in a register file utilized in a TriMedia-compatible media processor. It has been found, for example, that in many programmable architectures (e.g., VLIW, EPIC, and superscalar), register files are a large contributor to overall power consumption. In some applications, it has been found that a register file may consume up to 20% of the power consumed by a processing core. In media processors in particular, a register file is often comparatively large, and often includes many ports and registers. Some TriMedia-compatible processors, for example, utilize register files with 128 registers and 20 separate ports. Register file designs are wiring dominated, so relative power dissipation increases with technology scaling. As such, reducing power dissipation in a register file often leads to substantial savings in energy consumption in a media processor.

It has been found that the size of the register file in any programmable architecture is often determined by the applications that demand the highest number of active variables, which are typically stored in the register file. However, while executing other applications with fewer active variables, many of the registers in the register file remain unused. Also, within a particular application, the utilization of a register file can vary substantially at different points in the application. As an example, a TriMedia-compatible media processor has been found to have a comparatively high peak register utilization during AC3 decoding, while during the performance of other operations in a typical application, average register utilization is often relatively low. Thus, it is believed that, depending on the current requirements of a running application, it may be highly desirable to disable unused portions of a register file to reduce its overall power dissipation.

Figure 3:
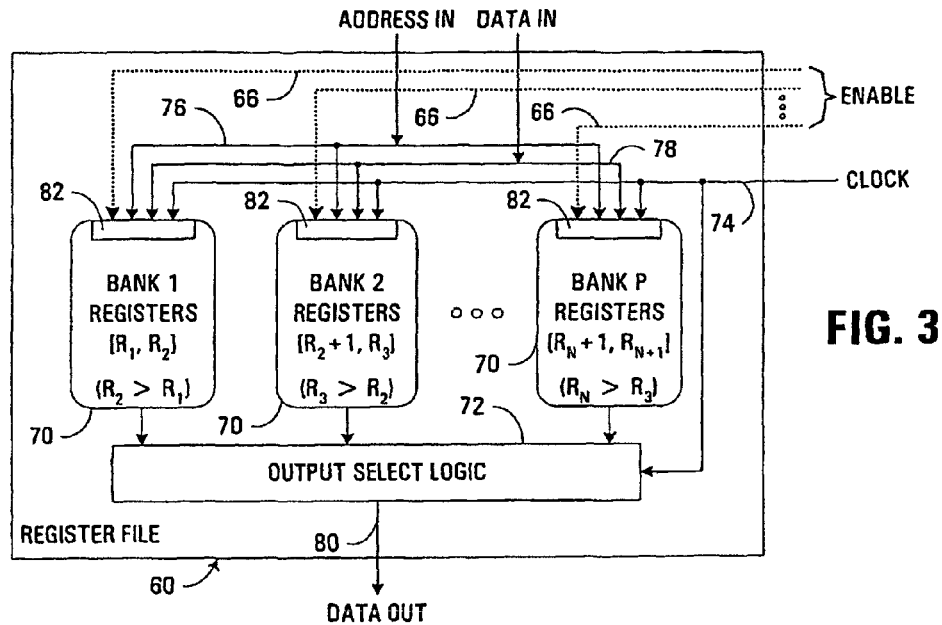
FIG. 3 is a block diagram of the register file referenced in FIG. 2, and incorporating enable logic for selectively disabling banks of registers.

As shown in particular in FIG. 3, one manner of selectively disabling portions of a register file is through partitioning the register file (here register file 60 of FIG. 2) along the address space into several banks 70, and then conditionally enabling or disabling these banks, e.g., in response to enable signals 66 supplied to the banks via power control circuit 62 (FIG. 2).

Each bank 70 may include a plurality of registers such that the register space represented by the register file is partitioned into sets of registers. For example, for a register file that includes 128 registers, it might be desirable to partition the register space into eight banks of 16 registers apiece. While other manners of partitioning registers may be used, it may be desirable, as an example, to utilize the most significant address inputs as bank select signals, and utilize the least significant address inputs to select a specific register from a selected bank. For example, where a register file is partitioned into eight 16 register banks, seven address inputs may be used, with the three high order inputs used as bank select signals, and the four low order inputs used as register select signals.

As is well known in the art, register file 60 includes output select logic 72, as well as various inputs such as a clock input 74, address in inputs 76 and data in inputs 78. Furthermore, register file 60 outputs data over data out outputs 80. It will be appreciated that, depending upon the number of input/output ports supported by the register file, as well as the number of registers and the width of each register, different numbers of address in, data in and data out signals may be supplied to the register file. In addition, input select logic (not shown) may also be utilized to support concurrent access of multiple registers by multiple functional units.

To selectively disable a bank of registers, the clock, address in and data in inputs supplied to each bank through an enable circuit 82 disposed in each bank. Furthermore, the enable signals 66 from the power control circuit are additionally fed to each enable circuit 82 to selectively gate off or guard the clock, address in and data in inputs for the associated register bank 70.

Enable circuit 82 within each bank may be implemented in a number of manners consistent with the invention. For example, one manner of implementing the enable circuit is through the use of a series of gate transistors, with one such transistor coupled to each clock, address in and data in input to a register bank, and gated by the enable signal 66 dedicated to that register bank.

By gating off the address and data inputs to each bank, and not just the clock input, comparatively greater energy savings are typically obtained due to the comparatively high wire capacitances that are associated with CMOS latch or flip-flop (synthesized) register implementations, because gating typically inhibits switching activity on the relatively long wires utilized within the register file banks. It should be appreciated, however, that in some implementations, the additional gating logic may introduce additional delays and may thus inhibit performance to a small extent. Moreover, it will be appreciated that the invention may be utilized in connection with register files implemented using different register implementations.

To implement software-based power dissipation control of register file 60, a power control instruction is supported in the instruction set architecture of CPU 14. One exemplary format for a power control instruction is illustrated at 90 in FIG. 4. As shown, the power control instruction 90 may include an opcode 92 that identifies the instruction as a pwr_control instruction, and an operand 94 that specifies power control information used to set the power modes for the various banks of registers in register file 60. Operand 94 may be implemented, for example, as an immediate operand including a bit mask that includes an enable/disable bit 96 assigned to each bank of registers in the register file. Thus, for example, for eight banks in a register file, an eight-bit immediate operand may be supported in instruction 90.

At a more general level, the size of operand 94 may be specified by the formula:

$$\sum_{i=1}^{j} \log_2(\text{Modes}(i))$$

where j is the number of hardware resources to be controlled (here, register banks) and Modes(i) is the number of power modes of hardware resource i.

Figure 4:
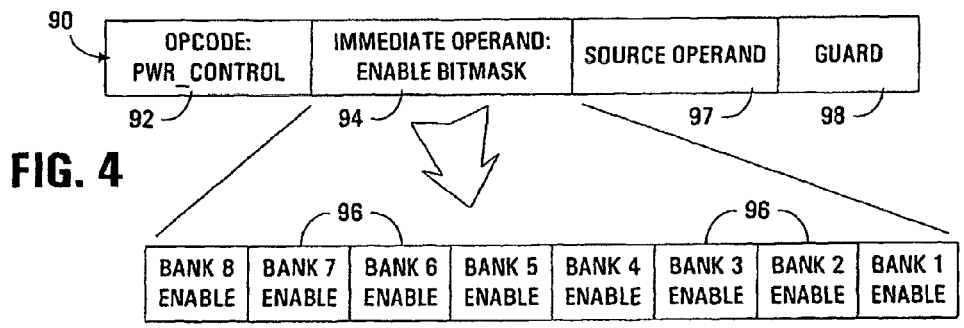
FIG. 4 is a block diagram of an exemplary instruction format for a power control instruction suitable for controlling power dissipation in the media processor of FIG. 1.

Other instruction formats may be used in the alternative. For example, as shown in FIG. 4, it may be desirable to support an optional source register operand 97 that identifies a register within which power modes state information is stored. Thus, rather than storing the power modes state information directly in the power control instruction and performing an immediate operation, the power modes state information can be maintained in a separate register, with a register operation used to retrieve the desired power modes state information. Other addressing modes may be supported in the alternative.

As is also shown in FIG. 4, it may also be desirable to support a guard operand 98, which may be used to specify a condition that must be met before the power modes state information specified by the power control instruction is applied. Practically any known condition may be used consistent with the invention.

Returning to FIG. 2, in the illustrated embodiment, a power control instruction is processed by the CPU 14 so as to update a power modes register 64 with the power control information specified in the power control instruction. As such, it may be desirable for the power modes register 64 to have an identical mapping to the immediate operand for the power control instruction, such that power control instruction is processed simply as an immediate write to the power modes register.

Moreover, as has been noted above, in some instances it may be desirable to utilize a pre-existing register such as the PCSW register to store power modes state information. In such instances, a power control instruction would not require a separate opcode. Instead, a preexisting opcode used to write to the appropriate register may be used, with the operand updating those bits that are utilized in connection with storing power modes state information.

Power control instructions may be incorporated into executable program code in a number of manners consistent with the invention. For example, power control instructions may be added to source code by a programmer during development. In the alternative, a compiler, optimizer, linker, etc., may perform simulation or static analysis of a program under development to determine appropriate locations to insert power control instructions based upon predicted resource utilization.

Furthermore, profiling, static analysis or simulation of a program may be used to determine what hardware resources should be utilized, and what resources should be disabled, during certain sections of the program. For example, if it is determined that only 10 registers are required in a certain section of a program, but that which 10 registers are used is immaterial to program semantics, it may be desirable for a compiler to use registers from only a limited number of register banks, and then insert appropriate power control instructions into the program code to disable unused register banks. Furthermore, if those 10 registers are initially dispersed throughout several register banks, it may be desirable to remap registers to concentrate the registers within a reduced number of register banks.

Figure 5:
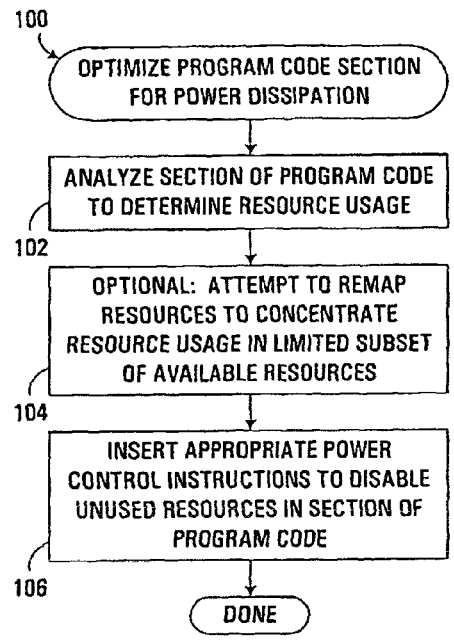
FIG. 5 is a flowchart illustrating the program flow of a power dissipation optimization routine consistent with the invention.

FIG. 5, for example, illustrates a power dissipation optimization routine 100 that may be executed during compilation or optimization of a computer program to optimize a section of a computer program for optimal power dissipation. For each specified section of a program, routine 100 first analyzes that section to determine the hardware resource usage by that section of program code in block 102. Next, block 104 is optionally executed to attempt to remap resources to concentrate resource usage into a limited set of hardware resources (e.g., to confine registers to a limited number of register banks). Next, block 106 generates and inserts appropriate power control instructions into the program code to disable any unused resources. Processing of the section is then complete.

Routine 100, or a routine similar in functionality thereto may also be utilized during runtime, e.g., in connection with interpretation or just-in-time compilation. Furthermore, it will be appreciated that routine 100 may be used in connection with the generation of instructions that are scheduled for parallel and/or out-of-order operation during runtime, e.g., in a superscalar processor architecture. In such implementations, a compiler and the runtime hardware desirably should limit reordering of power control instructions to minimize influence on other speculated instructions, e.g., by assigning a side effect to the power control instruction, which limits its run-time speculation. In still other embodiments, an operating system can schedule/issue power control instructions if a CPU/processor is not fully loaded with computations.

In the alternative, routine 100 may be used in connection with explicitly parallel instruction set architectures such as VLIW or EPIC code, where detection of parallel instructions occurs during compilation. In such implementations, the insertion of a power control instruction may be considered to include the insertion of a power control operation into a larger VLIW or EPIC instruction comprising multiple operations.

The program code within which power control instructions have been embedded during compilation or during runtime desirably includes program control instructions interspersed within the program code only at times for which a change in hardware resource utilization is desirable. Moreover, it is often desirable for a single power control instruction to be capable of controlling the enabled/disabled status of multiple hardware resources. As such, minimal additional processing overhead is typically associated with power control instructions consistent with the invention, thus minimizing any adverse performance effects due to the insertion of additional instructions into the program code.

Figure 6:
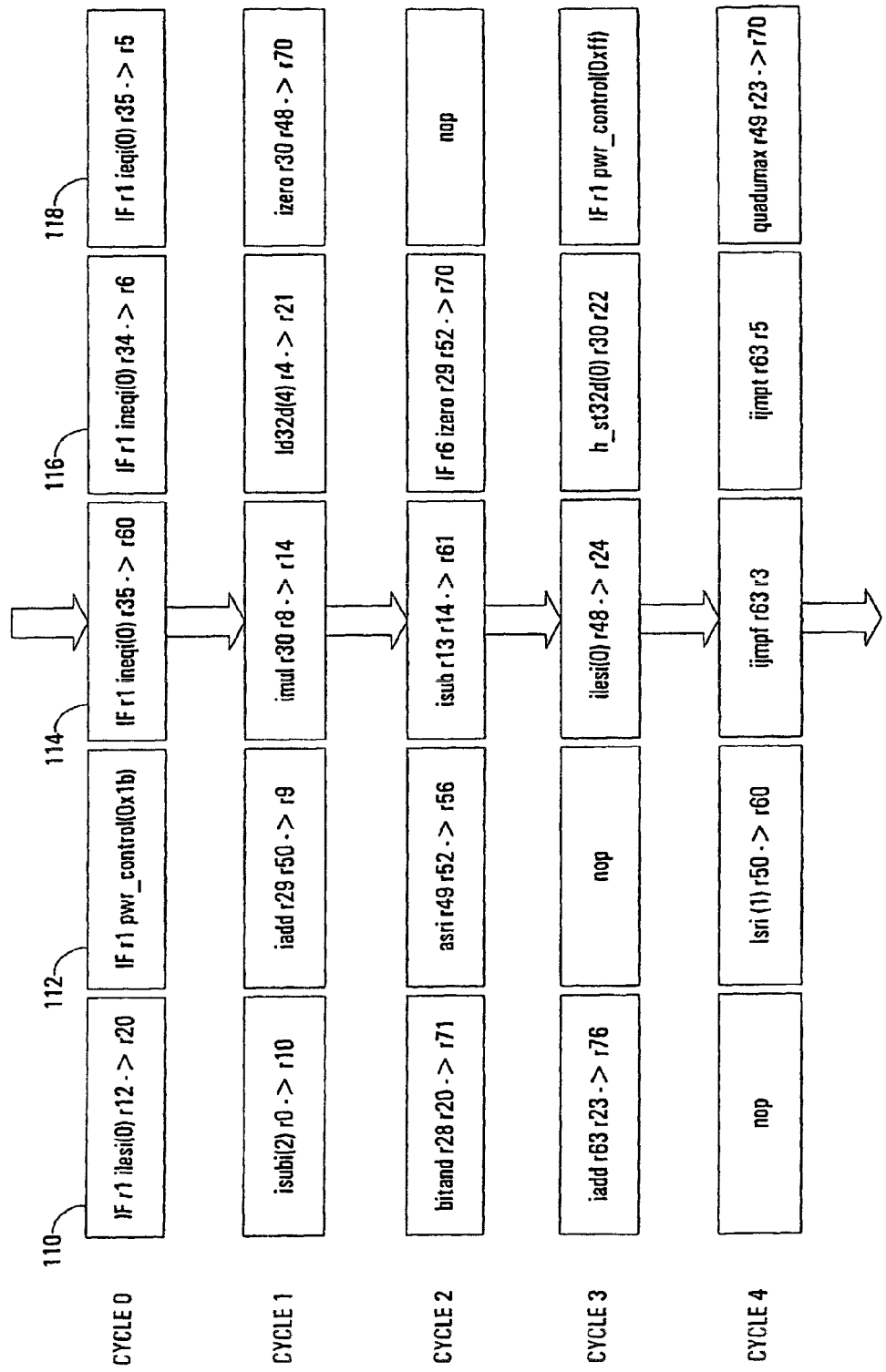
FIG. 6 is a block diagram illustrating the processing of an exemplary program by the media processor of FIG. 1.

FIG. 6, for example, diagrammatically illustrates the execution of an exemplary portion of a program compiled in the manner described above, e.g., as might be utilized in connection with a TriMedia-compatible media processor. In this example, it is assumed that there are five issue slots, designated at 110, 112, 114, 116 and 118, with the instruction executed in each issue slot during each cycle (cycles 0-4) illustrated in its respective issue slot for that cycle. Assume also that a register file includes 128 registers (denoted as r0-r127) partitioned into eight banks, and that a power control instruction utilizes an immediate operand where a selected bank is enabled when a binary "1" is encountered in the operand bit mask position associated with that bank. In this example, the latency of the pwr_control instruction is one cycle; however, it will be appreciated that a pwr_control instruction can have a latency of more than one cycle in some implementations.

Assume also that during cycle 0, one of the instructions being processed by the CPU (here in issue slot 112) is a power control instruction with an immediate operand of 0x1b (binary 00011011), which enables only banks 1, 2, 4 and 5 of the register file (i.e., registers r0-r31 and r48-r79). As a result of the execution of this instruction, power modes register 64 (FIG. 2), is updated to store the 0x1b (binary 00011011) value. As a result, during subsequent cycles, register banks 3, 6, 7 and 8 are disabled. Note, however, that, during execution of the power control instruction in cycle 0, all register banks are available for access by other instructions (assuming that all banks were previously enabled).

During cycles 1 and 2, no further power control instructions are encountered. As a result, register banks 3, 6, 7 and 8 remain disabled, and all instructions are limited to accessing registers from banks 1, 2, 4 and 5 (r0-r31 and r48-r79).

During cycle 3, the power modes state information stored in power modes register 64 continues to maintain register banks 3, 6, 7 and 8 in a disabled state. However, one of the instructions executed during this cycle (issued to issue slot 118) is a power control instruction with an immediate operand of 0xff (binary 11111111), which enables all eight banks of the register file for instructions executed in cycle 4.

The aforementioned dynamic power dissipation control techniques provide a number of advantages over conventional designs. Significant flexibility is provided in terms of controlling a wide variety of hardware resources with minimal processing overhead, as compared to conventional designs that require instructions to be routed to specific functional units, or that require enable/disable commands to be appended to every instruction and constantly decoded.

Furthermore, the aforementioned techniques provide the flexibility to address various power dissipation-related issues to appropriately balance performance and power dissipation in a number of useful ways. For example, using the aforementioned techniques, processor performance can be scaled up by, for example, adding registers or functional units, but without increasing power dissipation on the code where the extra resources are not utilized. Moreover, for applications where performance is not as crucial, power control instructions can serve to sacrifice performance for lower power consumption, e.g., by scheduling operations to limited resources while disabling other resources.

With respect to software-based power dissipation control, it will be appreciated that alternate instruction formats, alternate compilation, optimization and/or scheduling routines, and alternate processor architectures may be utilized in other embodiments consistent with the invention. Moreover, resource disabling circuitry other than that described above in connection with the herein-described banked register file design may be used in connection with software-based power dissipation control consistent with the invention.

Figure 7:
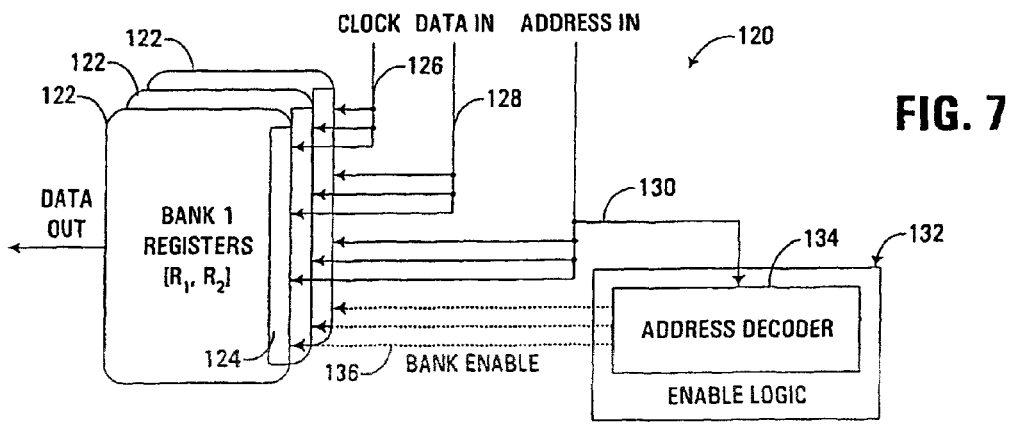
FIG. 7 is a block diagram of an alternate manner of controlling power dissipation in a register file to that shown in FIG. 2.

Furthermore, with respect to the herein-described banked register file design, it will be appreciated that control mechanisms other than the herein-described software-based control mechanism may be utilized consistent with the invention. For example, a hardware-based control mechanism may be used to dynamically enable certain hardware resources based upon dynamic decoding of read/write addresses. As an example, FIG. 7 illustrates an alternate register file design 120 that includes a plurality of register banks 122, each including gating logic 124 for use in selectively gating off clock inputs 126, data in inputs 128 and address in inputs 130 supplied to the register file, similar to register file 60 of FIG. 3. However, rather than being provided with enable signals from a software-based control circuit, register file 120 includes a hardware-based enable logic circuit 132 that includes an address decoder 134 for dynamically generating individual bank enable signals 136 for selectively disabling various unused register banks.

Address decoder 134 may, for example, selectively disable register banks during any cycle for which no registers within such banks are currently being accessed. Particularly for register files that support multiple input ports, a determination of what registers are being accessed during a given cycle is readily made, and thus provides the ability to selectively reduce power dissipation in a register file without any changes in the compiler and/or the instruction set architecture utilized by a particular processor design.

Various additional modifications will be apparent to one of ordinary skill in the art having the benefit of the instant disclosure. Therefore, the invention lies in the claims hereinafter appended.

What is claimed is:

1. A circuit arrangement, comprising:
a plurality of hardware resources, wherein each hardware resource has a power mode configurable between at least first and second power consumption states; and
a programmable multi-media processor circuit, including separate circuits on respective circuit paths for processing video and audio, coupled to the plurality of hardware resources, the processor circuit configured to process program code that includes at least one power control instruction that includes an operand having power control information disposed therein, and a guard that specifies a condition, whereby processing of the power control instruction selectively sets power modes of at least two hardware resources among the plurality of hardware resources based upon the power control information disposed in the power control instruction and in response to an occurrence of the condition, the processor circuit being further configured to maintain the power modes of the at least two hardware resources in respective power-consumption states according to a resource power-management schedule that indicates when less-than all of the plurality of resources are to be disabled, including sleep and fully-off states, while processing at least one subsequent instruction in the program code.

2. The circuit arrangement of claim 1, wherein the power control instruction includes an opcode that identifies the power control instruction and wherein the schedule is adopted during runtime or before runtime, and further comprising a register to store power-modes state information.

3. The circuit arrangement of claim 1, wherein each hardware resource is selected from the group consisting of a register file, a register bank, a register, a cache, a bus interface unit, a bus, a functional unit, a functional block and an instruction decoder.

4. The circuit arrangement of claim 1, wherein the processor circuit is configured to process explicitly parallel instructions, and wherein the power control instruction comprises an operation among a plurality of operations in an explicitly parallel instruction.

5. The circuit arrangement of claim 4, wherein the processor circuit is selected from the group consisting of a VLIW processor and an EPIC processor.

6. The circuit arrangement of claim 1, wherein the processor circuit comprises a superscalar processor.

7. The circuit arrangement of claim 1, wherein the processor circuit is configured to assign a side effect to the power control instruction to limit run-time speculation thereof.

8. The circuit arrangement of claim 1, wherein the plurality of hardware resources are disposed in the processor circuit.

9. The circuit arrangement of claim 1, wherein at least one hardware resource is disposed outside of the processor circuit but on the same integrated circuit as the processor circuit.

10. The circuit arrangement of claim 1, wherein at least one hardware resource is disposed on a separate integrated circuit from the processor circuit.

11. An integrated circuit comprising the circuit arrangement of claim 1.

12. The circuit arrangement of claim 1, wherein the processor circuit is further configured to set the power modes of the at least two hardware resources based on stored power modes state information for the plurality of hardware resources.

13. A method of executing program code on a processor circuit coupled to a plurality of hardware resources, each having a power mode configurable between at least first and second power consumption states, the method comprising:
processing a power control instruction from the program code by selectively setting power modes of at least two hardware resources among the plurality of hardware resources based upon power control information disposed in an operand of the power control instruction, and in response to the occurrence of an condition specified in a guard of the power control instruction;
storing power-modes state information in a register for access by the processor circuit;
operating the processor circuit according to a stored resource power-management schedule that indicates when less-than all of the plurality of resources are to be disabled; and
processing at least one subsequent instruction in the program code while the power modes of the at least two hardware resources are set to that specified by the power control information of the power control instruction.

14. The method of claim 13, wherein the power control instruction further includes an opcode that uniquely identifies the power control instruction.

15. The method of claim 13, wherein each hardware resource is selected from the group consisting of a register file, a register bank, a register, a cache, a bus interface unit, a bus, a functional unit, a functional block and an instruction decoder.

16. The method of claim 13, wherein the processor circuit is configured to process explicitly parallel instructions, and wherein the power control instruction comprises an operation among a plurality of operations in an explicitly parallel instruction.

17. The method of claim 13, further comprising setting the power modes of the at least two hardware resources based on stored power modes state information for the plurality of hardware resources.

* * * * *